US010458007B2

(12) United States Patent
Wert

(10) Patent No.: US 10,458,007 B2
(45) Date of Patent: Oct. 29, 2019

(54) QUENCH AND TEMPER CORROSION RESISTANT STEEL ALLOY

(71) Applicant: CRS HOLDINGS, INC., Wilmington, DE (US)

(72) Inventor: David E. Wert, Wyomissing, PA (US)

(73) Assignee: CRS HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/235,226

(22) Filed: Aug. 12, 2016

(65) Prior Publication Data

US 2017/0002447 A1  Jan. 5, 2017

Related U.S. Application Data

(63) Continuation of application No. 14/061,845, filed on Oct. 24, 2013, now abandoned.

(60) Provisional application No. 61/717,877, filed on Oct. 24, 2012.

(51) Int. Cl.

| C22C 38/52 | (2006.01) |
|---|---|
| C21D 6/00 | (2006.01) |
| C21D 1/18 | (2006.01) |
| C22C 38/02 | (2006.01) |
| C22C 38/04 | (2006.01) |
| C22C 38/42 | (2006.01) |
| C22C 38/44 | (2006.01) |
| C22C 38/46 | (2006.01) |
| C22C 38/50 | (2006.01) |
| C22C 38/00 | (2006.01) |
| C22C 38/06 | (2006.01) |
| C22C 38/48 | (2006.01) |
| C21D 8/00 | (2006.01) |
| B22F 1/00 | (2006.01) |
| B64C 9/02 | (2006.01) |
| B64C 25/00 | (2006.01) |
| C21D 9/00 | (2006.01) |
| C21D 6/04 | (2006.01) |
| C21D 7/13 | (2006.01) |

(52) U.S. Cl.

CPC ............ *C22C 38/52* (2013.01); *B22F 1/0003* (2013.01); *B64C 9/02* (2013.01); *B64C 25/00* (2013.01); *C21D 1/18* (2013.01); *C21D 6/004* (2013.01); *C21D 8/005* (2013.01); *C21D 9/0075* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C21D 6/04* (2013.01); *C21D 7/13* (2013.01); *C21D 2211/004* (2013.01); *C21D 2211/008* (2013.01)

(58) Field of Classification Search

CPC ......... C22C 38/52; C22C 38/46; C22C 38/44; C22C 38/04; C22C 38/02

See application file for complete search history.

(56) References Cited

U.S. PATENT DOCUMENTS

| 3,663,208 A * | 5/1972 | Kirby ...................... C22C 38/44 |
| | | 420/38 |
| 5,650,024 A | 7/1997 | Hasegawa et al. |
| 6,030,469 A | 2/2000 | Ernst et al. |
| 6,117,388 A | 9/2000 | Shibata et al. |
| 6,187,261 B1 | 2/2001 | Fedchun |
| 6,426,038 B1 | 7/2002 | Fedchun |
| 6,426,040 B1 | 7/2002 | Fedchun |
| 7,067,019 B1 | 6/2006 | Fedchun et al. |
| 7,160,399 B2 | 1/2007 | Kuehmann et al. |
| 8,361,247 B2 | 1/2013 | Vartanov |

(Continued)

FOREIGN PATENT DOCUMENTS

| EP | 0411931 | 2/1991 |
| EP | 0867522 | 9/1998 |
| EP | 0867523 | 9/1998 |

(Continued)

OTHER PUBLICATIONS

International Search Report, PCT/US2013/066496, dated Feb. 5, 2014, 5 pages.

(Continued)

*Primary Examiner* — Christopher S Kessler

(74) *Attorney, Agent, or Firm* — Dann, Dorfman, Herrell and Skillman, P.C.

(57) ABSTRACT

A quench and temper steel alloy is disclosed having the following composition in weight percent.

| C | 0.2-0.5 |
|---|---|
| Mn | 0.1-1.0 |
| Si | 0.1-1.2 |
| Cr | 9-14.5 |
| Ni | 2.0-5.5 |
| Mo | 1-2 |
| Cu | 0-1.0 |
| Co | 1-4 |
| W | 0.2 max. |
| V | 0.1-1.0 |
| Ti | up to 0.5 |
| Nb | 0-0.5 |
| Ta | 0-0.5 |
| Al | 0-0.25 |
| Ce | 0-0.01 |
| La | 0-0.01 |

The balance of the alloy is iron and the usual impurities including not more than about 0.01% phosphorus, not more than about 0.010% sulful, and not more than about 0.10% nitrogen. A quenched and tempered steel article made from this alloy is also disclosed. The steel article is characterized by a tensile strength of at least about 290 ksi, a fracture (Continued)

toughness ($k_{Ic}$) of at least about 65 ksi, good resistance to general corrosion, and good resistance to pitting corrosion.

9 Claims, No Drawings

(56) References Cited

U.S. PATENT DOCUMENTS

2005/0126662 A1* 6/2005 Cao .............................. 148/326
2009/0196784 A1   8/2009 Fedchun et al.

FOREIGN PATENT DOCUMENTS

| EP | 1466993 | 10/2004 |
|---|---|---|
| GB | 796733 | 6/1958 |
| GB | 1250898 | 10/1971 |
| GB | 2288188 | 10/1995 |
| WO | 2010044740 | 4/2010 |
| WO | WO 2010044740 A1 * | 4/2010 |

OTHER PUBLICATIONS

Written Opinion of ISA, PCT/US2013/066496, dated Feb. 5, 2014, 9 pages.
Lee, E.U. et al., "Aircraft Steels," Unclassified Report No. NAWCADPAX/TR-2009/12, Feb. 19, 2009, pp. 1-15.
Technical Data Sheet, Ferrium S53 Corrosion Resistant Ultrahigh-Strength Steel for Aerospace Structural Applications, QuesTek Innovations LLC, Mar. 2010 (2 pages).

* cited by examiner

QUENCH AND TEMPER CORROSION RESISTANT STEEL ALLOY

CROSS REFERENCE TO RELATED APPLICATION

This application is a continuation of U.S. application Ser. No. 14/061,845, filed Oct. 24, 2013, which claims the benefit of U.S. Provisional Application No. 61/717,877, filed Oct. 24, 2012, the entireties of which are incorporated herein by reference.

BACKGROUND OF THE INVENTION

Field of the Invention

This invention relates generally to steel alloys that provide very high strength in combination with good toughness in the quenched and tempered condition and in particular to such a steel alloy that also provides good corrosion resistance.

Description of the Related Art

Aircraft landing gear are critical components that are highly stressed and subject to adverse environmental conditions in use. Steel alloys such as AISI 4340 and the 300M alloy have long been used to make landing gear for aircraft because those alloys can be quenched and tempered to provide very high strength (ultimate tensile strength of at least 280 ksi) in combination with fracture toughness ($K_{Ic}$) of at least 50 ksi√in. However, neither of those alloys provides effective corrosion resistance. Therefore, it has been necessary to plate the landing gear components with a corrosion resistant metal such as cadmium. Cadmium is a highly toxic, carcinogenic material and its use has presented significant environmental risks in the manufacture and maintenance of aircraft landing gear and other components made from these alloys.

A known alloy that is sold under the registered trademark FERRIUM S53 was developed to provide a combination of strength and toughness similar to that provided by the 4340 and 300M alloys and to also provide corrosion resistance. The FERRIUM S53 alloy was designed to overcome the problems associated with using cadmium plating to provide adequate corrosion resistance in aircraft landing gear made from either the 4340 alloy or the 300M alloy. However, the FERRIUM S53 alloy includes a significant addition of cobalt which is a rare and thus, expensive element. In order to avoid the much higher cost of using the FERRIUM S53 for the landing gear application, attempts have been made to develop a quench and temper steel alloy that provides the strength, toughness, and corrosion resistance attributed to the FERRIUM S53 alloy, but without the addition of costly cobalt.

Cobalt-free martensitic steel alloys that can be quenched and tempered to provide strength and toughness comparable to the FERRIUM S53 alloy and which also provide corrosion resistance are described in U.S. Pat. No. 8,071,017 and in U.S. Pat. No. 8,361,247. However, it has been found that the corrosion resistance provided by those steels leaves something to be desired. Enhanced corrosion resistance is especially important for aircraft landing gear because they are exposed to many different types of corrosive environments, some of which are more aggressive than others at causing corrosion in steel. Accordingly, there is a need for a steel alloy that provides the very high strength and toughness needed for the landing gear application, that provides better corrosion resistance than the known corrosion resistant quench and temper steels, and that can be produced at a discount in price relative to steels that contain a substantial amount of cobalt.

SUMMARY OF THE INVENTION

The shortcomings of the known steels that are used for making landing gear are resolved to a large degree by a quench-and-temper alloy in accordance with the present invention. In accordance with one aspect of the present invention, there is provided a high strength, high toughness, corrosion resistant steel alloy that has the following broad and preferred weight percent compositions.

|    | Broad     | Preferred  |
|----|-----------|------------|
| C  | 0.2-0.5   | 0.35-0.45  |
| Mn | 0.1-1.0   | 0.1-0.7    |
| Si | 0.1-1.2   | 0.1-1.0    |
| Cr | 9-14.5    | 9.5-12.5   |
| Ni | 3.0-5.5   | 3.2-4.3    |
| Mo | 1-2       | 1.25-1.75  |
| Cu | up to 1.0 | 0.1-0.7    |
| Co | 1-4       | 2-3        |
| W  | 0.2 max.  | 0.1 max.   |
| V  | 0.1-1.0   | 0.3-0.6    |
| Ti | up to 0.5 | 0.01-0.2   |
| Nb | 0-0.5     | 0.01 max.  |
| Ta | 0-0.5     | 0.01 max.  |
| Al | 0-0.25    | 0.01 max.  |
| Ce | 0-0.01    | 0-0.006    |
| La | 0-0.01    | 0-0.005    |

The balance of the alloy is iron and the usual impurities found in similar grades of quench and temper steels intended for similar use or service, including not more than about 0.01% phosphorus, not more than about 0.010% sulfur, and not more than about 0.10% nitrogen.

The foregoing tabulation is provided as a convenient summary and is not intended to restrict the lower and upper values of the ranges of the individual elements for use in combination with each other, or to restrict the ranges of the elements for use solely in combination with each other. Thus, one or more of the ranges can be used with one or more of the other ranges for the remaining elements. In addition, a minimum or maximum for an element of the broad ranges can be used with the minimum or maximum for the same element in the preferred ranges, and vice versa. Moreover, the alloy according to the present invention may comprise, consist essentially of, or consist of the constituent elements described above and throughout this application. Here and throughout this specification the term "percent" or the symbol "%" means percent by weight or mass percent, unless otherwise specified.

In accordance with another aspect of the present invention, there is provided a quenched and tempered steel article that is made from either of the steel alloy compositions set forth above. The steel article is characterized by having a tensile strength of at least about 280 ksi and a fracture toughness ($K_{Ic}$) of at least about 65 ksi√in. The steel article is further characterized by having good resistance to general corrosion as determined by the salt spray test (ASTM B117) and good resistance to pitting corrosion as determined by the cyclic potentiodynamic polarization method (ASTM G61 Modified).

DETAILED DESCRIPTION

At least about 0.2% and preferably at least about 0.35% carbon is present in this alloy. Carbon combines with iron to form an Fe—C martensitic structure that benefits the high hardness and strength provided by the alloy. Carbon also forms carbides with molybdenum, vanadium, titanium, niobium, and/or tantalum that further strengthen the alloy during tempering. The carbides that form in the present alloy are predominantly MC-type carbides, but some $M_2C$, $M_6C$, $M_7C_3$, and $M_{23}C_6$ carbides may also be present. Too much carbon adversely affects the toughness and ductility provided by this alloy. Therefore, carbon is restricted to not more than about 0.5% and preferably to not more than about 0.45%.

The alloy according to this invention contains at least about 9% chromium to benefit the corrosion resistance and hardenability of the alloy. Preferably, the alloy contains at least about 9.5% chromium. More than about 14.5% chromium in the alloy adversely affects the toughness and ductility provided by the alloy. Preferably, the alloy contains not more than about 12.5% chromium.

Nickel is beneficial to the toughness and ductility provided by the alloy according to this invention. Therefore, the alloy contains at least about 3.0% nickel and preferably at least about 3.2% nickel. In order to limit the upside cost of the alloy, the amount of nickel is restricted to not more than about 5.5%. Preferably the alloy contains not more than about 4.3% nickel.

Molybdenum is a carbide forming element that forms $M_6C$ and $M_{23}C_6$ carbides that are beneficial to the temper resistance provided by this alloy. Molybdenum also contributes to the strength and fracture toughness provided by the alloy. Furthermore, molybdenum contributes to the pitting corrosion resistance provided by the alloy. The benefits provided by molybdenum are realized when the alloy contains at least about 1% molybdenum and preferably at least about 1.25% molybdenum. Like nickel, molybdenum does not provide an increasing advantage in properties relative to the increased cost of adding larger amounts of molybdenum. For that reason, the alloy contains not more than about 2% molybdenum and preferably not more than about 1.75% molybdenum.

The alloy of this invention contains a positive addition of cobalt to benefit the strength and toughness provided by the alloy. Cobalt also benefits the temper resistance of the alloy in a manner similar to molybdenum. Unexpectedly, cobalt appears to be beneficial for the corrosion resistance provided by the alloy. For these reasons, the alloy contains at least about 1% cobalt and preferably at least about 2% cobalt. Cobalt is a rare and thus, very expensive element. Therefore, in order to obtain the benefits of cobalt in this alloy and yet maintain a cost advantage relative to other high strength steel alloys that contain 6% or more cobalt, this alloy contains not more than about 4% cobalt. Preferably, the alloy contains not more than about 3% cobalt.

Vanadium and titanium combine with some of the carbon to form MC-type carbides that limit the grain size which in turn benefits the strength and toughness provided by the alloy according to this invention. The MC-type carbides formed by vanadium and titanium in this alloy also benefit the temper resistance and secondary hardening of the alloy. Therefore, the alloy contains at least about 0.1% vanadium and at least about 0.01% titanium. Preferably, the alloy contains at least about 0.3% vanadium. Too much vanadium and/or titanium adversely affects the strength of the alloy because of the formation of larger amounts of carbides in the alloy that depletes carbon from the martensitic matrix material. Accordingly, vanadium is preferably restricted to not more than about 0.6% and titanium is preferably restricted to not more than about 0.2% in this alloy. When the alloy is produced by powder metallurgy, titanium may not be needed. Therefore, it is expected that titanium would not be intentionally included when the alloy is produced in powder form.

At least about 0.1%, manganese may be present in this alloy primarily to deoxidize the alloy. It is believed that manganese may also benefit the high strength provided by the alloy. If too much manganese is present, then an undesirable amount of retained austenite may remain after quenching such that the high strength provided by the alloy is adversely affected. Therefore, the alloy contains not more than about 1.0% and preferably not more than about 0.7% manganese.

Silicon benefits the hardenability and temper resistance of this alloy. Therefore, the alloy preferably contains at least about 0.1% silicon. Too much silicon adversely affects the hardness, strength, and ductility of the alloy. In order to avoid such adverse effects silicon is restricted to not more than about 1.2% and preferably to not more than about 1.0% in this alloy.

Copper may be present in this alloy because it contributes to the hardenability, toughness, and ductility of the alloy. Copper may also benefit the alloy's machinability and corrosion resistance. The alloy preferably contains at least about 0.1% and better yet at least about 0.3% copper. The inventors have discovered that copper and nickel should be balanced in this alloy, particularly when the alloy contains very low or no positive addition of copper. Thus, when the alloy contains less than 0.1% copper, for example, not more than about 0.01% copper, at least about 3.75% and preferably not more than about 4.0% nickel should be present to ensure that the desired combination of strength, toughness, and ductility are provided. Too much copper can result in precipitation of an undesirable amount of free copper in the alloy matrix and adversely affect the fracture toughness of the alloy. Therefore, when copper is present in the alloy, copper is restricted to not more than about 1.0% and preferably to not more than about 0.7%.

Tungsten is a carbide forming element which, like molybdenum, contributes to the hardness and strength of this alloy when present. A small amount of tungsten, up to about 0.2% may be present in this alloy in substitution for some of the molybdenum. However, tungsten does not appear to benefit the corrosion resistance of the alloy. Therefore, the alloy preferably contains not more than about 0.1% tungsten.

Niobium and tantalum are carbide forming elements that combine with carbon to form $M_4C_3$ carbides that benefit the temper resistance and hardenability of the alloy. Therefore, the alloy may contain niobium and/or tantalum provided that the combined amount of niobium and tantalum (Nb+Ta) is not more than about 0.5%. However, in order to avoid the formation of excessive amounts of carbides, the alloy preferably contains not more than about 0.01% of niobium and/or tantalum.

Up to about 0.25% aluminum may be present in the alloy from deoxidation additions during melting. Preferably, the alloy contains not more than about 0.01% aluminum.

Up to about 0.01% of cerium and/or lanthanum may be present in this alloy as a result of misch metal additions during melting primary melting. The misch metal addition benefits the toughness of the alloy by combining with sulfur and or oxygen in the alloy, thereby limiting the size and shape of sulfide- and oxysulfide-inclusions that may be present. Preferably, the alloy contains not more than about 0.006% cerium and not more than about 0.005% lanthanum from such additions.

The balance of the alloy is iron and the usual impurities found in known grades of steels intended for similar purpose or service. In this regard, phosphorus is restricted to not more than about 0.01% and preferably to not more than about 0.005% in this alloy. Sulfur is restricted to not more than about 0.001% in this alloy and preferably to not more than about 0.0005%. When the alloy is made by powder metallurgy it may contain up to about 0.010% max. sulfur. Nitrogen is preferably maintained as low as practicable in this alloy. Preferably nitrogen is restricted to not more than about 0.05% and better yet to not more than about 0.03%. When the alloy is produced in powder form by nitrogen atomization, nitrogen will be inevitably present in the alloy powder. Accordingly, the alloy is expected to contain up to about 0.10% nitrogen in the nitrogen-atomized powder form of the alloy.

The alloy according to this invention is preferably prepared by vacuum induction melting (VIM) and refined by vacuum arc remelting (VAR). For some applications, the alloy can be refined by electroslag remelting (ESR) after VIM. For less-critical applications the alloy can be arc melted and refined by VAR. In addition, this alloy can be produced by powder metallurgy techniques.

For cast/wrought product forms of the alloy, the VAR or ESR ingot is preferably given a homogenization heat treatment after removal from the mold. The homogenization is preferably carried out by heating the ingot at about 2200° F. to about 2375° F. for about 9 to 18 hours depending on the size of the ingot. The ingot is then hot worked to a billet having a smaller cross-sectional area. The billet is further hot worked such as by forging or rolling to provide an intermediate product form having a desired cross-section dimension and shape, for example, round or square bar. The intermediate product form is preferably normalized by heating the alloy under temperature and time conditions sufficient to dissolve Cr-rich carbides that may have precipitated during solidification. Preferably, the intermediate product is normalized by heating at about 1925-2050° F. for about 2 to 8 hours. The alloy is then annealed by further heating the alloy at about 1100-1250° F. for about 2 to 12 hours. This low annealing temperature helps to keep the dissolved chromium carbides in solution.

The alloy is preferably formed into final or near-final product forms in the annealed condition. Final product forms made from the alloy are hardened by heating the alloy at a temperature of about 1950-2050° F., preferably at about 2000° F., for a time sufficient to fully austenitize the alloy and to dissolve most, preferably all, of the remaining chromium carbides so that the amount of chromium present in the alloy matrix can be maximized. The alloy is then preferably oil quenched from the austenitizing temperature. To ensure a substantially full transformation to a martensitic structure and minimize the presence of retained austenite, the alloy is preferably deep chilled at about −100° F. for at least about 1 hour and then warmed in air. The alloy is then tempered to final hardness by heating at about 350-550° F., preferably at about 400° F., for 1-6 hours, and then cooled to room temperature. The tempering temperature is selected to maximize toughness while minimizing the re-precipitation of chromium carbides in the alloy.

In the quenched and tempered condition, the alloy comprises a dispersion of carbides as discussed above in the Fe—C martensitic matrix. The carbides present in the alloy and articles made therefrom are predominantly, if not entirely, greater than 10 nm in major cross-sectional dimension. Preferably, the heat treating parameters are controlled so that the carbide size is not greater than about 15 µm in major cross-sectional dimension.

A steel article made from the alloy described above and processed in accordance with the foregoing processing steps provides a combination of properties that make it particularly useful for aircraft landing gear and other aeronautical or aerospace structural components, including but not limited to flap tracks, slat tracks, rotating shafts, and actuators, and for other applications where the non-corrosion resistant steels 300M and 4340 are currently used. In particular, a steel article fabricated from the alloy that is hardened and tempered as set forth above provides a tensile strength of at least 280 ksi, preferably at least 285 ksi, and a fracture toughness ($K_{Ic}$) of at least 65 ksi√in when tested with a test machine that meets the requirements of ASTM Standard Test Procedure E1290. A steel article in accordance with this invention is also characterized by a Charpy V-notch impact energy of at least 20 ft-lbs when tested in accordance with ASTM Standard Test Procedure E23. Further, a steel article in accordance with this invention is characterized by general corrosion resistance such that the article does not rust when tested in accordance with ASTM Standard Test procedure B 117 and by sufficient pitting corrosion resistance such that the article has a pitting potential of at least 90 mV when tested in accordance with a modified ASTM Standard Test procedure G61. The ASTM G61 test procedure was modified by using round bar rather than flat samples. The use of round bar samples exposes the end grains and can be considered to be a more severe test than the standard G61 procedure.

WORKING EXAMPLES

In order to demonstrate the novel combination of strength, ductility, toughness, and corrosion resistance provided by the alloy according to this invention, a comparative testing program was carried out. Five 400 lb. heats having the weight percent compositions set forth in Table IA and five additional 400 lb. heats having the weight percent compositions set forth in Table IB below were produced by VIM and VAR. The chemistries set forth in Tables IA and IB were obtained from the VIM electrode ingots. The heats reported in Table IA are referred to as the nominal copper heats, whereas the heats reported in Table IB are referred to as the low-copper heats.

TABLE IA

| Element | Heat 1 | Heat 2 | Heat A | Heat B | Heat C |
|---|---|---|---|---|---|
| C | 0.38 | 0.39 | 0.40 | 0.38 | 0.40 |
| Mn | 0.59 | 0.60 | 0.59 | 0.60 | 0.59 |
| Si | 0.89 | 0.91 | 0.90 | 0.92 | 0.90 |
| P | <0.005 | <0.005 | <0.005 | <0.005 | <0.005 |
| S | <0.001 | 0.0005 | 0.0009 | <0.001 | <0.001 |
| Cr | 9.97 | 9.96 | 9.98 | 10.07 | 9.93 |
| Ni | 3.48 | 3.50 | 3.50 | 3.55 | 3.48 |
| Mo | 1.49 | 1.49 | 0.90 | 1.52 | 1.98 |
| Cu | 0.51 | 0.51 | 0.51 | 0.50 | 0.51 |
| Co | 2.48 | 2.50 | — | <0.01 | 2.48 |
| W | — | — | 0.10 | — | — |
| V | 0.48 | 0.50 | 0.50 | 0.51 | 0.49 |
| Ti | 0.08 | 0.09 | 0.09 | 0.10 | 0.08 |
| Ce | — | 0.004 | — | — | — |
| La | — | 0.002 | — | — | — |

TABLE IB

| Element | Heat 3 | Heat 4 | Heat D | Heat E | Heat F |
|---|---|---|---|---|---|
| C | 0.40 | 0.40 | 0.40 | .040 | .041 |
| Mn | 0.62 | 0.61 | 0.60 | 0.60 | 0.60 |
| Si | 0.90 | 0.90 | 0.89 | 0.88 | 0.88 |
| P | <0.005 | <0.005 | <0.005 | <0.005 | <0.005 |
| S | 0.003 | 0.0014 | 0.001 | 0.0012 | 0.0013 |
| Cr | 9.96 | 9.95 | 9.92 | 10.10 | 9.98 |
| Ni | 3.76 | 4.01 | 3.50 | 4.23 | 4.49 |
| Mo | 1.50 | 1.50 | 1.49 | 1.50 | 1.50 |
| Cu | <0.01 | <0.01 | <0.01 | <0.01 | <0.01 |
| Co | 2.49 | 2.50 | 2.45 | 2.50 | 2.50 |
| W | — | — | — | — | — |
| V | 0.50 | 0.50 | 0.49 | 0.50 | 0.50 |
| Ti | 0.08 | 0.09 | 0.01 | 0.09 | 0.09 |
| Ce | — | — | — | — | — |
| La | — | — | — | — | — |

The balance of each heat is iron and usual impurities. Heats 1 to 4 are representative of the alloy according to the present invention. Heats A to F are comparative heats. In particular, Heat A is within the scope of the alloy described in U.S. Pat. No. 8,361,247.

The VIM heats were melted and cast as 6-inch round electrodes for remelting. The 6-inch round electrodes were remelted by VAR into 8-inch round ingots. The VAR ingots were cooled in air after being stripped from the molds, stress relieved at 1150° F. for 3 hours, and then air cooled from the stress relieving temperature. The ingots were then charged into a furnace running at 1200° F. The furnace temperature was ramped up to 1600° F. and held for a time sufficient to equalize the temperature of the ingots. The furnace temperature was then ramped up to 2300° F. and the ingots were heated at 2300° F. for 16 hours. The furnace temperature was decreased to 2200° F. and the ingots were held at that temperature for 1 hour. All ingots were double end forged from a starting temperature of 2200° F. to 5.75-inch square billets with a single reheat at 2200° F. The billets were then reheated to 2200° F. and double end forged to 4.25-inch square billets, again with a single reheat. The billets were cooled in a hot box overnight, air cooled to room temperature, and then overage/annealed at 1150° F. for 3 hours and air cooled.

Test specimens for the nominal copper heats were prepared as follows. A 3-inch thick cut was made from one end of each of the billets, and then a 24-inch long piece was cut from each billet. The 24-inch long pieces were charged into a furnace running at 1200° F. The furnace temperature was ramped up to 1600° F. and held at that temperature to equalize the temperature of the pieces. The furnace temperature was then ramped up to 2200° F. and held at that temperature for 1 hour. The billet pieces were double-end forged to 3-inch square bars with one reheat at 2200° F. The 3-inch square bars were hot cut into four pieces each approximately 6 in. long with the remainder cooled in a hot box. The 3-inch square bar pieces were reheated at 2200° F., double end forged to 1⅜" square with one reheat, and then hot cut into two pieces. The 1⅜" square bars were reheated at 2200° F., and then single end forged to ¾-inch square bars without a reheat. The bars were cooled in a hot box overnight and then air cooled to room temperature. The ¾-inch bars were normalized by heating them at 1950° F. for 4 hours and then cooling in air. The bars were then overage annealed at 1150° F. for 6 hours and cooled in air. Longitudinal smooth and notched tensile samples ($K_t=3$), longitudinal Charpy V-notch (CVN) samples, and longitudinal rising step load (RSL) fracture toughness samples were rough machined from the ¾-inch square bars of each heat. Rough machined samples were preheated at 800° F. for 15 minutes in air. The samples from Heats 1, 2, B, and C were then austenitized at 2000° F. for 1 hour and oil quenched, refrigerated at –100° F. for 1 hour, warmed in air, tempered at 400° F. for 3 hours, and then cooled in air. The samples from comparative Example A were austenitized at 1975° F. for 1 hour, oil quenched for 2½ minutes, and then air cooled. The samples were then refrigerated at –100° F. for 1 hour, warmed in air, tempered at 350° F. for 3 hours, and then cooled in air. All samples were finish machined following heat treatment.

Samples from the nominal copper heats were rough machined for corrosion testing. Pitting potential samples, salt spray cone samples, and RSL stress corrosion cracking (SCC) samples were preheated at 800° F. for 15 minutes in air, austenitized at 1975° F. (2000° F. for Heat A) for 1 hour, oil quenched, refrigerated at –100° F. for 1 hour, air warmed, and tempered at 350° F. for 3 hours, air cooled. All samples were finish machined to final dimension after heat treatment.

Test specimens for the low-copper heats were prepared as follows. A 3-inch trim cut was made from one end of the billets, and then two pieces at 8-inch long were cut from each billet. The 8-inch long pieces were charged into the furnace at 1200° F., ramped up to 1600° F., equalized, ramped up to 2200° F., and held at temperature for 1 hour. The billets were double end forged to 3-inch square bars with one reheat at 2200° F. The 3-inch square bars were each hot cut into 2 pieces. The 3-inch square pieces were reheated at 2200° F., double end forged to 1⅜ inch square bars with one reheat, and then hot cut into 2 pieces. The 1⅜ inch square bars were reheated at 2100° F., and then single end forged to 0.725 inch square, with no reheats. The bars were cooled in a hot box overnight, and then air cooled the next day. The bars were then normalized at 1950° F. for 4 hours, air cooled, overage annealed at 1150° F. for 6 hours, and air cooled.

Longitudinal smooth tensile samples, longitudinal notched tensile samples ($K_t=3$), longitudinal CVN samples, longitudinal RSL fracture toughness samples, cyclic polarization (pitting potential) samples, salt spray cones, and longitudinal RSL SCC samples were rough machined from the 0.725 inch square bars of each heat. Rough machined samples from Heats 3, 4, and D were preheated at 800° F. for 15 minutes in air, austenitized at 2000° F. for 1 hour, oil quenched, refrigerated at –100° F. for 1 hour, air warmed, and tempered at 400° F. for 3 hours, air cooled. Samples from Heats E and F were treated in a similar manner with the exception of using a 1975° F. austenitizing temperature. Samples were finish machined following heat treatment.

The results of room temperature tensile testing on the samples of nominal copper heats are shown in Table IIA below including the 0.2% offset yield strength (Y.S.) and the ultimate tensile strength (U.T.S) in ksi, the percent elongation (% El.), the percent reduction in area (% R.A.), and the notch tensile strength (N.T.S.) in ksi. Individual and average values are reported. The corresponding results for the low copper heats are shown in Table IIB below.

TABLE IIA

| Heat | Aust. Temp. (° F.) | Temper Temp. (° F.) | Y.S. | U.T.S. | % El. | % R.A. | N.T.S. |
|---|---|---|---|---|---|---|---|
| 1 | 2000 | 400 | 213 | 293 | 15.3 | 49.1 | 365 |
| | | | 212 | 292 | 13.9 | 43.6 | 401 |
| | | | 214 | 292 | 16.0 | 48.6 | (1) |
| | | Average | 213 | 292 | 15.1 | 47.1 | 383 |

TABLE IIA-continued

| Heat | Aust. Temp. (° F.) | Temper Temp. (° F.) | Y.S. | U.T.S. | % El. | % R.A. | N.T.S. |
|---|---|---|---|---|---|---|---|
| 2 | 2000 | 400 | — | 291 | 16.3 | 46.1 | 387 |
| | | | 209 | 292 | 14.8 | 43.7 | 384 |
| | | | 207 | 292 | 15.2 | 45.4 | 395 |
| | | | 214 | 293 | 16.0 | 46.0 | (1) |
| | | | 209 | 290 | 15.2 | 45.7 | (1) |
| | | | 209 | 292 | 15.3 | 46.6 | (1) |
| | | Average | 210 | 292 | 15.5 | 45.6 | 389 |
| A | 1975 | 350 | 214 | 296 | 12.5 | 32.8 | 407 |
| | | | 216 | 296 | 12.2 | 30.3 | 409 |
| | | | 217 | 296 | 12.7 | 33.8 | 409 |
| | | Average | 216 | 296 | 12.5 | 32.3 | 408 |
| B | 2000 | 400 | 203 | 289 | 14.5 | 45.5 | 402 |
| | | | 204 | 289 | 12.9 | 37.5 | 411 |
| | | | 209 | 288 | 15.4 | 48.8 | 407 |
| | | | 203 | 290 | 15.0 | 48.4 | (1) |
| | | | 219 | 290 | 14.5 | 48.0 | (1) |
| | | | 215 | 290 | 15.3 | 46.1 | (1) |
| | | Average | 209 | 289 | 14.6 | 45.7 | 407 |
| C | 2000 | 400 | 214 | 294 | 12.8 | 27.4 | 401 |
| | | | 209 | 294 | 16.0 | 46.6 | 399 |
| | | | 215 | 294 | 16.0 | 39.1 | 405 |
| | | | 215 | 294 | 15.0 | 34.6 | (1) |
| | | | 214 | 295 | 16.0 | 40.5 | (1) |
| | | | 215 | 294 | 13.9 | 28.1 | (1) |
| | | Average | 214 | 294 | 15.0 | 36.1 | 402 |

(1) Only three samples per heat were tested.

TABLE IIB

| Heat | Aust. Temp. (° F.) | Temper Temp. (° F.) | Y.S. | U.T.S. | % El. | % R.A. | N.T.S. |
|---|---|---|---|---|---|---|---|
| 3 | 2000 | 400 | 208 | 296 | 16.1 | 44.3 | 402 |
| | | | 213 | 295 | 16.9 | 47.0 | 405 |
| | | | 208 | 297 | 14.5 | 40.9 | 401 |
| | | | 210 | 296 | 14.1 | 39.2 | |
| | | | 206 | 295 | 15.1 | 41.1 | |
| | | | 211 | 296 | 16.0 | 46.1 | |
| | | Average | 209 | 296 | 15.5 | 43.1 | 403 |
| 4 | 2000 | 400 | 207 | 291 | 15.2 | 45.6 | 397 |
| | | | 207 | 292 | 16.3 | 46.5 | 401 |
| | | | 207 | 292 | 16.5 | 43.2 | 395 |
| | | | 207 | 291 | 14.2 | 43.2 | |
| | | | 207 | 292 | 15.0 | 44.8 | |
| | | | 208 | 292 | 15.5 | 45.3 | |
| | | Average | 207 | 292 | 15.5 | 44.8 | 398 |
| D | 2000 | 400 | 208 | 290 | (1) | (1) | 399 |
| | | | 210 | 297 | 13.0 | 33.2 | 407 |
| | | | 205 | 296 | 13.2 | 37.1 | 383 |
| | | | 209 | 298 | 13.5 | 30.5 | (2) |
| | | | 209 | 295 | 12.2 | 32.9 | (2) |
| | | | 208 | 299 | (1) | (1) | (2) |
| | | Average | 208 | 296 | 13.0 | 33.4 | 396 |
| E | 1975 | 400 | 201 | 285 | 15.4 | 44.7 | 397 |
| | | | 203 | 286 | 16.2 | 40.2 | 395 |
| | | | 203 | 285 | 16.1 | 44.5 | 399 |
| | | | 204 | 285 | 16.2 | 43.8 | |
| | | | 205 | 285 | 16.2 | 43.9 | |
| | | | 203 | 284 | 16.0 | 45.2 | |
| | | Average | 203 | 285 | 16.0 | 43.7 | 397 |
| F | 1975 | 400 | 201 | 281 | 14.2 | 36.9 | 387 |
| | | | 197 | 281 | 14.9 | 41.8 | 391 |
| | | | 201 | 281 | 14.0 | 41.8 | 396 |
| | | | 203 | 281 | 15.5 | 41.3 | |
| | | | 203 | 282 | 15.2 | 43.5 | |
| | | | 201 | 282 | 14.8 | 39.3 | |
| | | Average | 201 | 281 | 14.8 | 40.8 | 391 |

(1) Test not valid because specimen broke outside of the gage section.
(2) Only three samples per heat were tested.

The results of the room temperature hardness and toughness tests (individual and average) are set forth in Tables IIIA and IIIB below including the Rockwell C-scale hardness (HRC) and the Charpy V-notch impact energy (CVN) in foot-pounds (ft.-lbs).

TABLE IIIA

| Heat | HRC | CVN | Avg. CVN |
|---|---|---|---|
| 1 | 54.0 | 22.4, 21.4, 21.2, 21.7, 22.5, 21.7 | 22.0 |
| 2 | 54.0 | 19.6, 19.8, 20.6, 19.9, 18.8, 20.6 | 20.0 |
| A | 55.0 | 19.9, 20.5, 20.2 | 20.0 |
| B | 54.0 | 20.9, 21.1, 20.4, 20.8, 20.1, 20.2 | 21.0 |
| C | 54.5 | 21.1, 20.6, 20.5, 20.8, 19.8, 20.0 | 20.5 |

TABLE IIIB

| Heat | HRC | CVN | Avg. CVN |
|---|---|---|---|
| 3 | 53.5 | 18.7, 18.8, 19.4, 19.3, 19.0 | 19.0 |
| 4 | 53.5 | 19.3, 18.5, 20.1, 19.7, 20.2 | 19.5 |
| D | 55.0 | 18.1, 18.0, 18.5, 20.2, 18.9, 19.2 | 19.0 |
| E | 53.0 | 19.5, 18.6, 19.7, 16.7, 19.9 | 19.0 |
| F | 53.0 | 21.3, 21.3, 19.0, 21.5, 20.5 | 20.5 |

The results of room temperature fracture toughness testing ($K_{IC}$) (individual and average values) are presented in Table IV as ksi√in.

TABLE IVA

| Example | $K_{IC}$ | Avg. |
|---|---|---|
| 1 | 67.4, 70.7 | 69 |
| 2 | 68.6, 70.2 | 69 |
| A | 53.6, 54.5 | 54 |
| B | 67.4, 63.7, 63.6 | 65 |
| C | 59.8, 61.8, 58.2, 58.9 | 60 |

TABLE IVB

| Example | $K_{IC}$ | Avg. |
|---|---|---|
| 3 | 65.7, 65.7 | 66 |
| 4 | 67.8, 70.5 | 69 |
| D | 59.3, 61.5, 62.8 | 61 |
| E | 65.2, 64.6 | 65 |
| F | 67.4, 67.8 | 68 |

Cleaned, un-passivated cyclic polarization samples were tested in a 3.5% NaCl solution, natural pH, at room temperature to determine pitting potential in accordance with the modified ASTM G61 procedure described above. Salt spray corrosion testing was run on duplicate polished cone samples from all heats. Samples were tested in accordance with ASTM B117, using a 5% NaCl concentration, natural pH, at 95° F. for 200 hour test duration. Prior to testing, all salt spray cones were passivated using 20% nitric acid+3 oz./gallon sodium dichromate at a temperature of 120 to 140° F. for 30 minutes. Time to first rust was noted for all samples, as well as a final rating after the completion of the test duration.

The results of the pitting potential test are set forth in Tables VA and VB below including the pitting potential in millivolts (mV) as measured at the knee of the curve plotted by the testing apparatus.

TABLE VA

| Example | Pitting Potential |
|---------|-------------------|
| 1 | 165.9, 183.3 |
| 2 | 98.4, 86.5 |
| A | −84, −151.6 |
| B | 66.7, 86.5 |
| C | 172.6, 197.6 |

TABLE VB

| Example | Pitting Potential |
|---------|-------------------|
| 3 | 213.3, 217.1 |
| 4 | 230.5, 71.4 |
| D | 89.3, 94.4 |
| E | 176.2, 236.2 |
| F | 215.2, 249.5 |

The results of the salt spray test are shown in Tables VIA and VIB below including the time to first appearance of rust on a specimen surface and a rating based on comparison of the tested specimens. (1=no rust, 2=1 to 3 spots of rust, 3=<5% of surface rusted, 4=5-10% of surface rusted, and 5=10-20% of the surface rusted)

TABLE VIA

| Example | Time to First Rust | Final Rating |
|---------|--------------------|--------------| 
| 1 | None/None | 1/1 |
| 2 | None/None | 1/1 |
| A | 1 hour/1 hour | 2/2 |
| B | None/None | 1/1 |
| C | None/None | 1/1 |

TABLE VIB

| Example | Time to First Rust | Final Rating |
|---------|--------------------|--------------|
| 3 | None/None | 1/1 |
| 4 | None/None | 1/1 |
| D | None/None | 1/1 |
| E | None/None | 1/1 |
| F | None/None | 1/1 |

RSL stress corrosion cracking tests were performed in accordance with ASTM Standard Test Procedure F1624. Samples from all heats were tested in 3.5% NaCl solution, natural pH, at room temperature. The first test of each heat was run using 1 hour steps and the second run used 2 hour steps. A further sample from each of Heats 3, 4, E, and F was run using 4 hour steps. The results of the stress corrosion cracking tests are shown in Tables VIIA and VIIB below including the stress corrosion cracking resistance ($K_{ISCC}$) in ksi

TABLE VIIA

| | $K_{ISCC}$ | | |
|---------|------|------|-------|
| Example | 1 H | 2 H | Final |
| 1 | 21.0 | 18.3 | 18 |
| 2 | 18.4 | 17.7 | 18 |
| A | 19.9 | 15.8 | 16 |
| B | 15.4 | 10.0 | 10 |
| C | 11.6 | 11.2 | 11 |

TABLE VIIB

| | $K_{ISCC}$ | | | |
|---------|------|------|------|-------|
| Example | 1 H | 2 H | 4 H | Final |
| 3 | 17.9 | 13.5 | 17.7 | 14 |
| 4 | 13.3 | 10.7 | 17.1 | 11 |
| D | 16.1 | 12.1 | — | 12 |
| E | 14.7 | 13.6 | 9.9 | 10 |
| F | 17.6 | 10.6 | 10.6 | 11 |

The data presented in the foregoing tables show that Heats 1, 2, 3, and 4 provide a good combination of strength, ductility, toughness, and corrosion resistance. The data also show that although the comparative Heats A-D provide acceptable strength in general, they leave something to be desired with respect to other important properties. More specifically, Heat A has tensile ductility, fracture toughness, and pitting and general corrosion resistance that are inferior to Heats 1 and 2. Heat B has less than desirable pitting corrosion resistance and stress corrosion cracking resistance compared to Heats 1 and 2. Heat C has tensile strength, notch tensile strength, and general and pitting corrosion resistance that are comparable to Heat 1 and 2. However, the tensile ductility, impact toughness, fracture toughness, and stress corrosion cracking resistance of Heat C are inferior to Heats 1 and 2. Heat D has several properties that are inferior relative to Heats 3 and 4, including tensile ductility, fracture toughness, and pitting resistance. Heats E and F have tensile strength that is less than acceptable relative to Heats 3 and 4. The yield strength provided by those heats would likely render those alloys unsuitable for the primary application for this alloy, namely, structural components for aircraft.

The terms and expressions which are employed in this specification are used as terms of description and not of limitation. There is no intention in the use of such terms and expressions of excluding any equivalents of the features shown and described or portions thereof. It is recognized that various modifications are possible within the invention described and claimed herein.

The invention claimed is:

1. A steel alloy consisting essentially of, in weight percent, about

| | |
|-----|-----------|
| C | 0.35-0.45 |
| Mn | 0.1-0.7 |
| Si | 0.1-1.0 |
| Cr | 9.5-12.5 |
| Ni | 3.2-4.3 |
| Mo | 1.25-1.75 |
| Cu | 0.1-1.0 |
| Co | 2-3 |
| W | up to 0.05 |
| V | 0.3-0.6 |
| Ti | 0.01-0.2 |
| Nb | up to 0.01 |
| Ta | up to 0.01 |
| Al | 0.01 max. |
| Ce | 0-0.006 |
| La | 0-0.005 | and the balance is iron and impurities wherein phosphorus is restricted to not more than about 0.005%, sulfur is restricted to not more than about 0.001%, and nitrogen is restricted to not more than about 0.03%.

2. The alloy set forth in claim 1 wherein copper is not more than about 0.7%.

3. The alloy set forth in claim 1 wherein copper is at least about 0.3%.

4. A quenched and tempered steel article made from the alloy set claim 1 which has a tensile strength of at least 290 ksi.

5. The steel article set forth in claim 4 which has a fracture toughness ($K_{Ic}$) of at least about 65 ksi√in when tested in accordance with ASTM Standard Test Procedure E1290.

6. The steel article set forth in claim 5 which has sufficient general corrosion resistance such that the article does not rust after 200 hours when tested in accordance with ASTM Standard Test procedure B 117.

7. The steel article as set forth in claim 5 which has sufficient pitting corrosion resistance such that the article has a pitting potential of at least 90 mV when tested in accordance with ASTM Standard Test procedure G61 modified by using round bar samples.

8. A structural component for an aerospace vehicle wherein the component is made from an alloy consisting essentially of, in weight percent, about

| | |
|---|---|
| C | 0.35-0.45 |
| Mn | 0.1-0.7 |
| Si | 0.1-1.0 |
| Cr | 9.5-12.5 |
| Ni | 3.2-4.3 |
| Mo | 1.25-1.75 |
| Cu | 0.1-0.7 |
| Co | 2-3 |
| W | 0.1 max. |
| V | 0.3-0.6 |
| Ti | 0.01-0.2 |
| Nb | 0.01 max. |
| Ta | 0.01 max. |
| Al | 0.01 max. |
| Ce | 0-0.006 |
| La | 0-0.005 | and the balance is iron and impurities wherein phosphorus is restricted to not more than about 0.005%, sulfur is restricted to not more than about 0.0005%, and nitrogen is restricted to not more than about 0.03%.

9. The aerospace structural component as set forth in claim 8 wherein the component is selected from the group consisting of one or more of landing gear, a rotatable shaft, an actuator, flap tracks, and slat tracks.

* * * * *